United States Patent
Youn et al.

(10) Patent No.: US 7,274,875 B2
(45) Date of Patent: Sep. 25, 2007

(54) OPTICAL CHANNEL POWER EQUALIZER

(75) Inventors: Ji Wook Youn, Daejeon (KR); Hyun Jae Lee, Daejeon (KR); Yool Kwon, Busan (KR)

(73) Assignee: Electronics and Telecommunications Research Institute (KR)

( * ) Notice: Subject to any disclaimer, the term of this patent is extended or adjusted under 35 U.S.C. 154(b) by 702 days.

(21) Appl. No.: 10/723,508

(22) Filed: Nov. 25, 2003

(65) Prior Publication Data

US 2004/0120709 A1    Jun. 24, 2004

(30) Foreign Application Priority Data

Dec. 20, 2002    (KR) ..................... 10-2002-0081931

(51) Int. Cl.
  *H04B 10/08*    (2006.01)
  *H04B 17/00*    (2006.01)
  *H04J 14/02*    (2006.01)
(52) U.S. Cl. .............................. 398/79; 398/33; 398/38
(58) Field of Classification Search .................. 398/38, 398/25, 33, 79; 359/618, 629, 634, 639; 356/432, 433, 450, 484, 488, 521
See application file for complete search history.

(56) References Cited

U.S. PATENT DOCUMENTS 6,341,021 B1    1/2002    Wilner et al.
6,400,479 B1    6/2002    Zhou et al.
7,092,638 B2 *  8/2006    Funami et al. .............. 398/158

OTHER PUBLICATIONS

Hyo Sang Kim, et al. "Dynamic Gain Equalization . . . Tunable Filters", OFC '98 Technical Digest (pp. 136-138).

* cited by examiner

*Primary Examiner*—M. R. Sedighian
(74) *Attorney, Agent, or Firm*—Blakely Sokoloff Talyor & Zafman

(57) ABSTRACT

An optical channel power equalizer for equalizing the per-channel power levels of a multi-channel optical signal is provided. The channel power equalizer includes an optical spectrum measurement unit that extracts a portion of the amplified optical signal and measures the per-channel power levels of the extracted optical signal; a controller that compares the measured power levels with a predetermined reference value, and determines to output the degrees of attenuation per channel based on differences between the measured per-channel power levels and the reference value; and a per-channel optical attenuation unit that attenuates the per-channel power levels of a plurality of input optical signals based on the degrees of attenuation and outputs the attenuated optical signals as the plurality of channels.

6 Claims, 4 Drawing Sheets

OPTICAL ATTENUATION SIGNALS

OPTICAL CHANNEL POWER EQUALIZER

This application claims the priority of Korean Patent Application No. 2002-81931 filed 20 Dec. 2002, in the Korean Intellectual Property Office, the disclosure of which is incorporated herein in its entirety by reference.

BACKGROUND OF THE INVENTION

1. Field of the Invention

The present invention relates to an optical channel power equalizer for equalizing per-channel power levels of a multi-channel optical signal.

2. Description of the Related Art

Since a conventional multi-wavelength optical transmission system is operated by a point-to-point transmission method, multi-channel optical signals in the system are transmitted via the same transmission line. Consequently, they experienced the same transmission characteristics and optical losses. On the other hand, a current multi-wavelength optical transmission system is changed to adopt a point-to-multipoint transmission method that employs an optical add/drop multiplexer and an optical cross connector. When optical signals transmitted via different paths are switched per channel or link in the multi-wavelength optical transmission system, the per-channel power levels of the switched multi-channel optical signals are different from each other. In order to guarantee the transmission performance of the system, the per-channel power levels of the multi-channel optical signal should be equalized to a predetermined value before they are multiplexed into an optical signal.

As conventional methods for equalizing optical power levels per channel in the multi-wavelength optical transmission system, there may be various methods using tunable acousto-optical filters or photo detectors detecting each channel. However, it is difficult to precisely measure the per-channel power levels of the multi-channel optical signal using these methods. Also, when using the photo detectors, the number of photo detectors increases according to the increase of the number of channels. It is therefore hard to implement the method of employing the photo detectors, as the system capacity increases.

SUMMARY OF THE INVENTION

The present invention provides an optical channel power equalizer for equalizing the per-channel power levels of a multi-channel optical signal by adjusting amounts of optical attenuation per channel based on an optical spectrum measured by using an optical wavelength separating unit and an optical detection unit.

According to an aspect of the present invention, there is provided an optical channel power equalizer for equalizing the per-channel power levels of a multi-channel optical signal, in which a plurality of channels are multiplexed and amplified, the channel power equalizer comprising an optical spectrum measurement unit that extracts a portion of the amplified optical signal and measures the per-channel power levels of the extracted optical signal; a controller that compares the measured power levels with a predetermined reference value, and determines to output the degrees of attenuation per channel based on differences between the measured per-channel power levels and the reference value; and a per-channel optical attenuation unit that attenuates the per-channel power levels of a plurality of input optical signals based on the degrees of attenuation and outputs the attenuated optical signals as the plurality of channels.

BRIEF DESCRIPTION OF THE DRAWINGS

The above and other aspects and advantages of the present invention will become more apparent by describing in detail preferred embodiments thereof with reference to the attached drawings in which.

DETAILED DESCRIPTION OF THE INVENTION

Hereinafter, preferred embodiments of the present invention will be described in detail with reference to the accompanying drawings.

Figure 1:
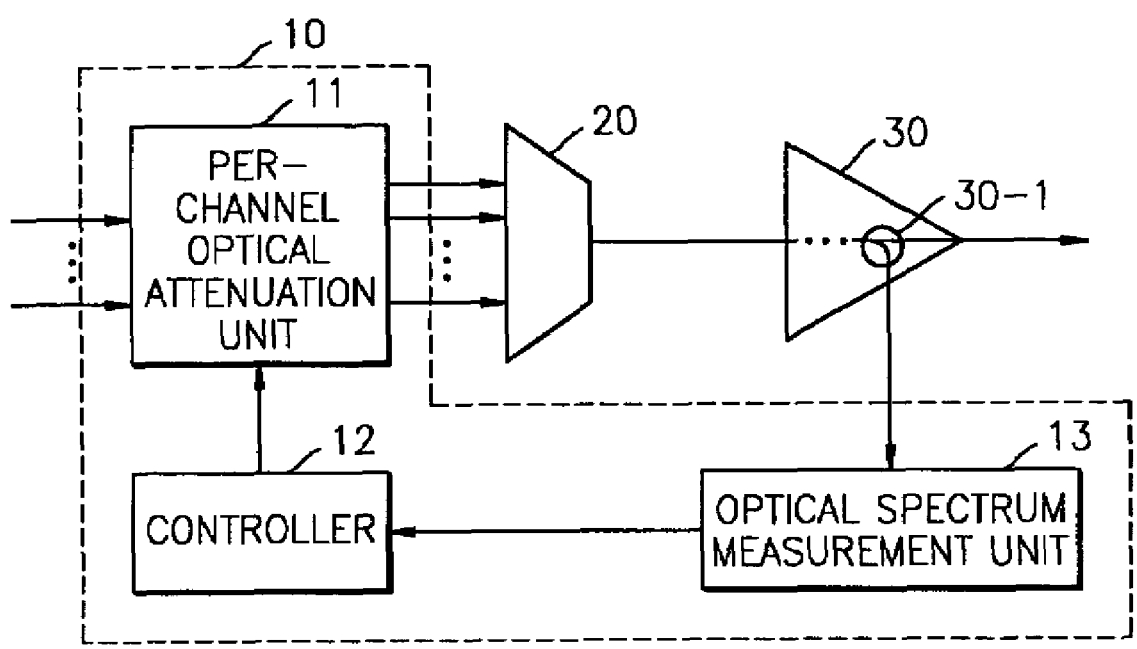
FIG. 1 is a block diagram of a channel power equalizer and an optical amplifier connected to the channel power equalizer, according to a preferred embodiment of the present invention.

FIG. 1 is a block diagram of an optical channel power equalizer and an optical amplifier connected to the optical channel power equalizer, according to a preferred embodiment of the present invention.

Referring to FIG. 1, the optical channel power equalizer 10 includes a per-channel optical attenuation unit 11, a controller 12, and an optical spectrum measurement unit 13. A multiplexer 20 and the optical amplifier 30 are connected successively to the per-channel optical attenuation unit 11. An optical spectrum measurement unit 13 is connected to one side of the optical amplifier 30.

When receiving optical signals, the per-channel optical attenuation unit 11 attenuates the optical signals channel-by-channel in response to optical attenuation signals indicating the degrees of attenuation. The multiplexer 20 multiplexes multi-channel optical signals output from the per-channel optical attenuation unit 11 and the optical amplifier 30 amplifies the multiplexed optical signal. An optical coupler 30-1 is built within the optical amplifier 30 and divides the amplified optical signal into two signals at a ratio of 99:1. The divided 1% optical signal is input to the optical spectrum measurement unit 13. The optical spectrum measurement unit 13 separates the input optical signal channel-by-channel, measures the optical spectrum of the per-channel optical signals, and measures the power levels of the per-channel optical signals. The controller 13 compares the measured channel power levels with a predetermined reference value, determines the degrees of attenuation per channel, and outputs optical attenuation signals based on the determined degrees of attenuation. The per-channel optical attenuation unit 11 equalizes the power levels of the optical signals per channel by attenuating them in response to the optical attenuation signals output from the controller 12.

Figure 2:
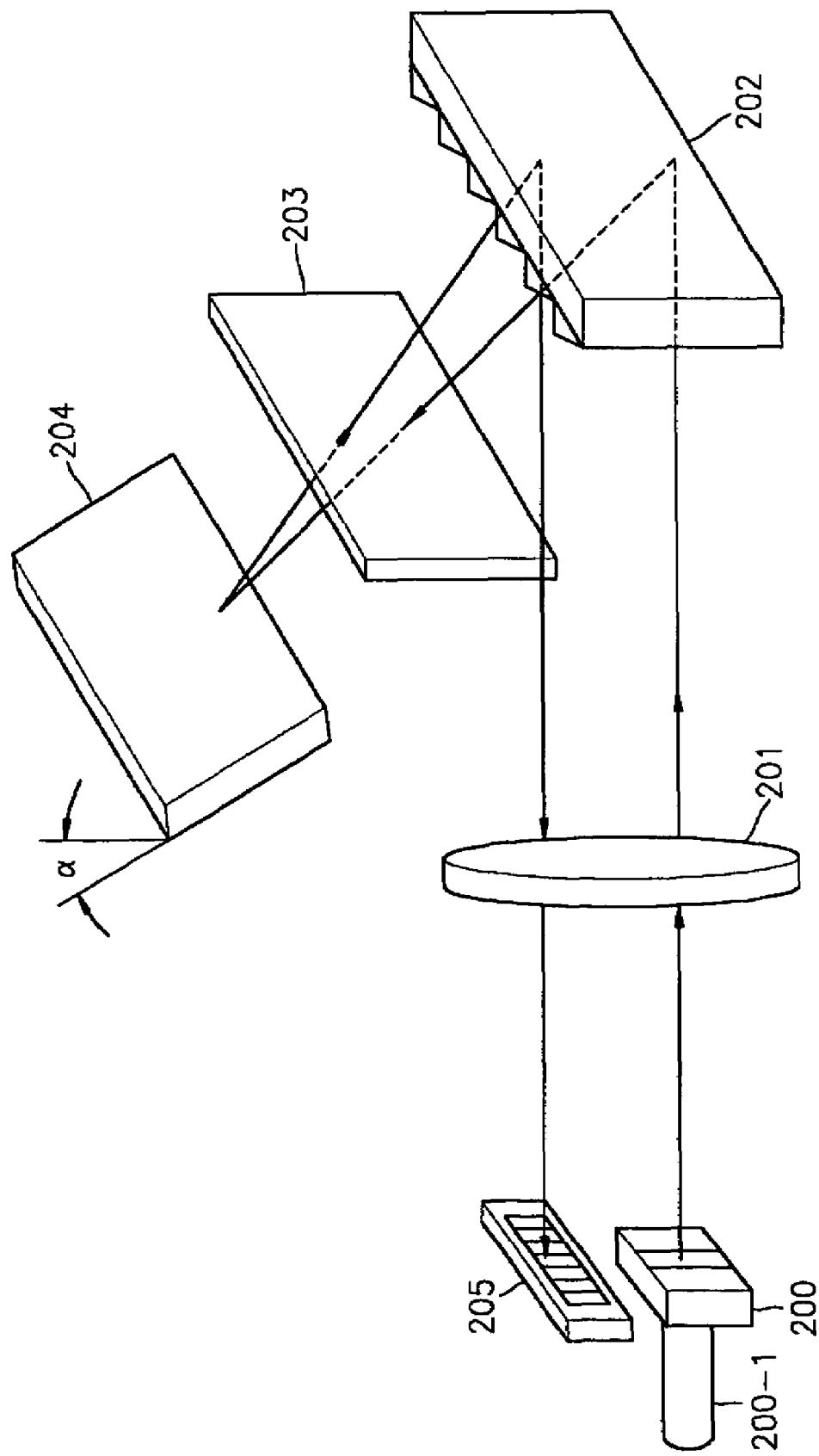
FIG. 2 illustrates in detail the structure of an optical spectrum measurement unit shown in FIG. 1.

FIG. 2 illustrates in detail the structure of the optical spectrum measurement unit 13 shown in FIG. 1. Referring to FIG. 2, the optical spectrum measurement unit 13 includes an optical input unit 200, a lens 201, an optical wavelength separator 202, a phase delayer 203, a plane mirror 204, and an optical detection unit 205. The optical input unit 200 is a means, such as a slit or a ferrule, which is connected to an optical fiber 200-1 and adjusts the spot size of an input optical signal. The lens 201 collimates a light, which is dispersed after passing through the optical input unit 200, and the optical wavelength separator 202 separates the collimated light wavelength-by-wavelength. Here, the optical wavelength separator 202 is preferably a diffraction grating. The optical wavelength separator 202 separates the light incident upon the grating surface wavelength-by-wavelength, and reflects or refracts the separated lights. That is, the optical wavelength separator 202 transforms a waveform of the light in a time domain into a plurality of waveforms in a frequency domain. The phase delayer 203 changes the polarization state of lights by delaying the phases of the lights differently according to the wavelengths. The plane mirror 204 is tilted at a predetermined angle α to reflect a multi-wavelength beam and reflects change the propagation path of the beam. Here, the predetermined angle a denotes an angle at which a light reflected by the plane mirror 204 is collimated at a different position of the lens 201, compared to the light passing through the optical input unit 200. The light reflected by the plane mirror 204 is again incident upon the optical wavelength separator 202 via the phase delayer 203. The optical wavelength separator 202 separates the light again into wavelength units so that a wavelength spacing increases. The lens 201 focuses the light collimated and paralleled by the optical wavelength separator 202 and sends the focused light into the optical detection unit 205. The photo detection unit 205, which is preferably a photo diode array sensor made of a plurality of photo diodes put together, outputs the intensities of the per-wavelength optical signal. Accordingly, the wavelength-divided optical signals are positioned at the same plane, thus reducing problems due to aberration. According to the above-described structure, effects by aberration can be reduced by locating the per-wavelength separated lights on the same plane. As a result, it is possible to measure an optical spectrum within a wide dynamic range.

Figure 3:
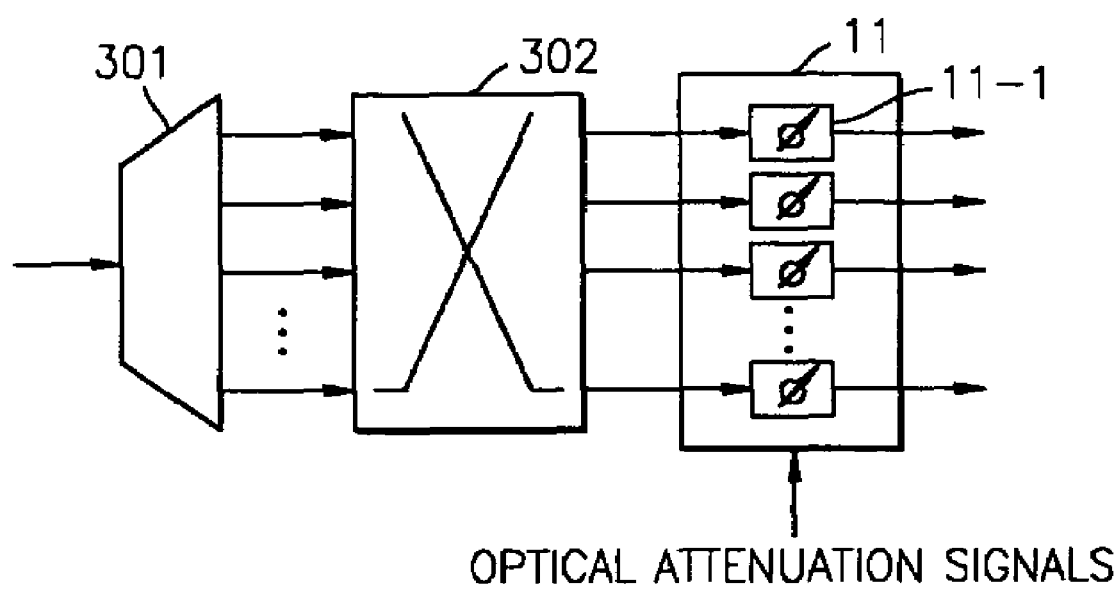
FIG. 3 illustrates a per-channel optical attenuation unit in FIG. 1 and means for inputting optical signals to the per-channel optical attenuation unit.

FIG. 3 illustrates a per-channel optical attenuation unit in FIG. 1 and means for inputting optical signals to the per-channel optical attenuation unit. Referring to FIG. 3, the per-channel optical attenuation unit 11 includes a plurality of optical attenuators 11-1. Reference numbers 301 and 302 indicate a demultiplexer and switch, respectively, included in an Optical Add-Drop Multiplexer or Optical Cross Connect.

The demultiplexer 301 demultipexes an input multiplexed optical signal to separate it per channel. The switch 302, which may be a combination of a plurality of 1×2 switches, switches each channel input from the demultiplexer 301. The switch 302 also enables channel add or drop. The optical attenuators 11-1 equalize the per-channel power levels of the optical signals by attenuating them in response to optical attenuation signals input from the controller 12.

Figure 4A:
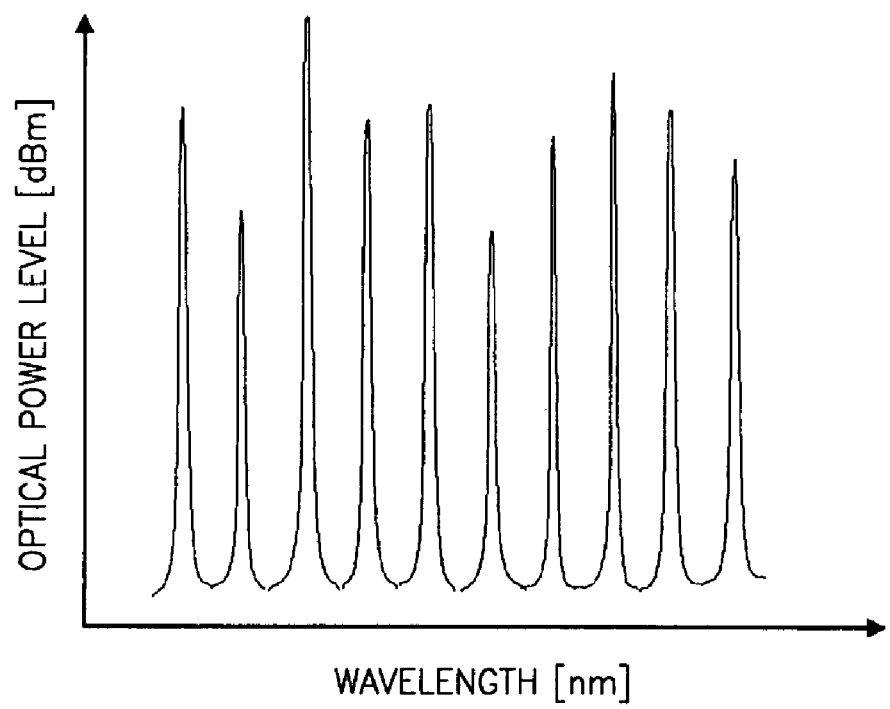
FIG. 4A is a graph illustrating an optical spectrum of an optical signal that has yet to be input to a channel power equalizer according to the present invention.
Figure 4B:
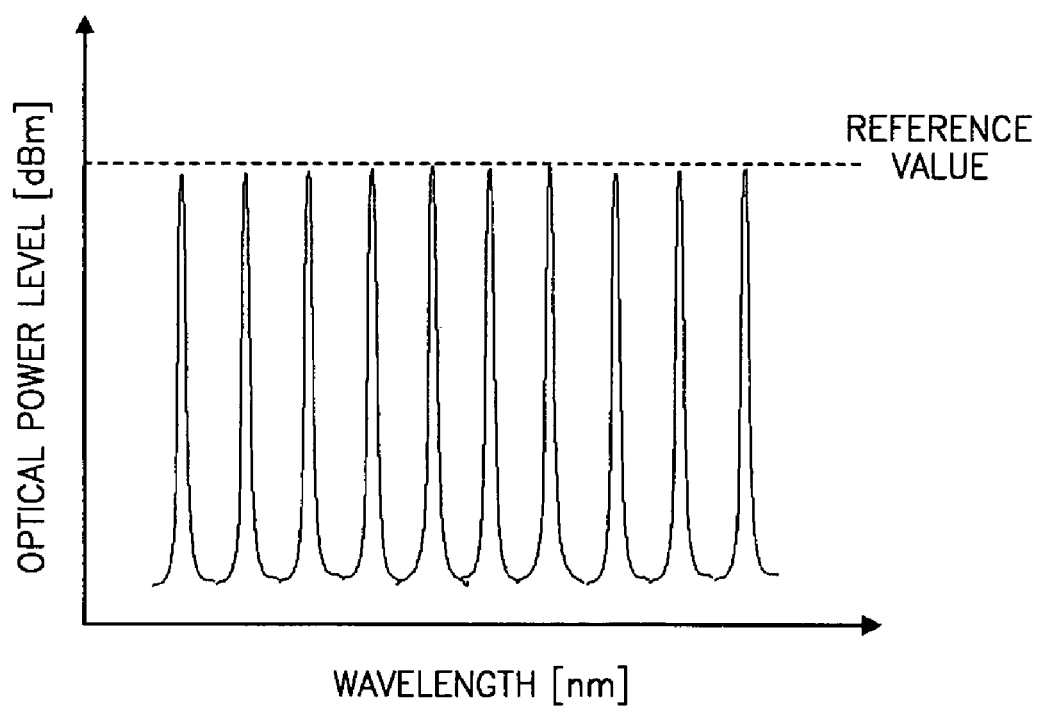
FIG. 4B is a graph illustrating the spectrum of an optically amplified signal whose power levels for each channel being equalized using an optical channel power equalizer according to the present invention.

FIGS. 4A and 4B are graphs illustrating per-channel optical spectrums. In detail, FIG. 4A illustrates a per-channel optical spectrum of an optical signal that has yet to be input to an optical channel power equalizer according to the present invention. FIG. 4B is a graph illustrating the spectrum of an optically amplified signal that is equalized per channel using an optical channel power equalizer according to the present invention. Referring to FIG. 4B, the per-channel power levels of an optical signal can be equalized using an optical channel power equalizer according to the preset invention.

According to the present invention, the per-channel optical spectrum of a multi-channel signal is measured using a photo detection unit aligned with an optical wavelength separator, and the degrees of attenuation per channel are adjusted based on the measured optical spectrum, thereby equalizing the per-channel power levels of the multi-channel signal. An optical channel power equalizer according to the present invention is constructed to reduce problems caused by aberration and polarization of light, thereby enabling precise measurement of the per-channel power levels of a multi-channel optical signal within a wide dynamic range. Since the behavior of the optical channel power equalizer is not affected by the number of channels and channel wavelengths, the optical channel power equalizer can be employed without changing its structure even if the system capacity increases. Also, the optical channel power equalizer can be manufactured in a small size to be easily built in a multi-wavelength optical transmission system, thereby easily improving the performance of the system. Further, the optical channel power equalizer according to the present invention is capable of measuring the per-channel optical spectrum of a multi-channel optical signal at once, and thus can be used as an optical spectrum measurement unit for gain flattening of an optical amplifier.

While this invention has been particularly shown and described with reference to preferred embodiments thereof, it will be understood by those skilled in the art that various changes in form and details may be made therein without departing from the spirit and scope of the invention as defined by the appended claims.

What is claimed is:

1. An optical channel power equalizer for equalizing per-channel power levels of a multi-channel optical signal, in which a plurality of channels are multiplexed and amplified, the optical channel power equalizer comprising:

an optical spectrum measurement unit that extracts a portion of the amplified optical signal and measures the per-channel power levels of the extracted optical signal, the optical spectrum measurement unit including an optical input unit that adjusts a spot size of the input optical signal;

a controller that compares the measured power levels with a predetermined reference value, and determines to output the degrees of attenuation per channel based on differences between the measured per-channel power levels and the reference value; and a per-channel optical attenuation unit that attenuates the per-channel power levels of a plurality of input optical signals based on the degrees of attenuation and outputs the attenuated optical signals as the plurality of channels, wherein the optical spectrum measurement unit includes: a lens that collimates in parallel a light that is dispersed and input by the optical input unit; an optical wavelength separator that separates a light passing through the lens in a wavelength unit; a phase delayer that delays phases to change polarization states of the per-wavelength separated lights; a plane mirror that reflects the lights passing through the phase delayer; and an optical detection unit that receives to measure the power levels of the lights being reflected by the plane mirror and passing through the phase delayer, the optical wavelength separator, and the lens, sequentially.

2. The optical channel power equalizer of claim 1, wherein the optical wavelength separator is a diffraction grating.

3. The optical channel power equalizer of claim 2, wherein the plane mirror is tilted at an angle at which the lights input from the optical wavelength separator can be collimated by the lens at a different position of the lens, compared to the light input from the optical input unit.

4. The optical channel power equalizer of claim 2, wherein the optical detecting unit is a combination of a plurality of photo diodes that convert the per-channel power levels of the lights into electrical signals.

5. The optical channel power equalizer of claim 1, wherein the plane mirror is tilted at an angle at which the lights input from the optical wavelength separator can be collimated by the lens at a different position of the lens, compared to the light input from the optical input unit.

6. The optical channel power equalizer of claim 1, wherein the per-channel optical attenuation unit comprises a plurality of optical attenuators that attenuate the power levels of each channel of the input optical signals, based on per-channel attenuation degrees input from the controller.

* * * * *